US009523506B2

(12) United States Patent
Lee

(10) Patent No.: US 9,523,506 B2
(45) Date of Patent: Dec. 20, 2016

(54) DOUBLE DEEP, SINGLE WIDTH OVENS FOR USE IN AIRCRAFT GALLEYS

(71) Applicant: MAG AEROSPACE INDUSTRIES, INC., Carson, CA (US)

(72) Inventor: Thomas Marks Lee, Coto De Caza, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 351 days.

(21) Appl. No.: 13/966,459

(22) Filed: Aug. 14, 2013

(65) Prior Publication Data

US 2014/0048054 A1  Feb. 20, 2014

Related U.S. Application Data

(60) Provisional application No. 61/682,936, filed on Aug. 14, 2012.

(51) Int. Cl.
| | |
|---|---|
| *F24C 15/00* | (2006.01) |
| *B64D 11/00* | (2006.01) |
| *B64D 37/30* | (2006.01) |
| *B64D 47/02* | (2006.01) |
| *B64D 11/04* | (2006.01) |

(52) U.S. Cl.
CPC ............... *F24C 15/00* (2013.01); *B64D 11/00* (2013.01); *B64D 11/04* (2013.01); *B64D 37/30* (2013.01); *B64D 47/02* (2013.01); *Y02T 50/46* (2013.01); *Y10T 29/49826* (2015.01)

(58) Field of Classification Search
CPC .................................. B64D 11/04; F24C 15/08
USPC .................................................. 126/20, 19 R
See application file for complete search history.

(56) References Cited

U.S. PATENT DOCUMENTS

| 3,439,665 A | * | 4/1969 | Stromqvist | .................. 126/21 A |
| 3,908,749 A | * | 9/1975 | Williams | ......................... 165/61 |
| 4,055,317 A | | 10/1977 | Greiss | |
| 4,384,191 A | * | 5/1983 | Guibert | ......................... 219/400 |
| 6,305,643 B1 | * | 10/2001 | Sankrithi | .................... 244/118.1 |
| 8,387,916 B2 | | 3/2013 | Baatz et al. | |
| 2005/0121978 A1 | * | 6/2005 | McAvoy | .................. H02J 3/14 |
| | | | | 307/43 |

(Continued)

FOREIGN PATENT DOCUMENTS

| CN | 101384483 | 3/2009 |
| EP | 0033030 A2 | 8/1981 |
| WO | 2007/096000 A1 | 8/2007 |

OTHER PUBLICATIONS

Chinese Patent Application No. 201380048364.0, Office Action (and English translation) dated May 5, 2016.

(Continued)

*Primary Examiner* — Avinash Savani
(74) *Attorney, Agent, or Firm* — Kilpatrick Townsend & Stockton LLP; Dean W. Russell; Kristin M. Crall

(57) ABSTRACT

Embodiments of the present invention provide double deep, single width ovens for use in aircraft galleys. The ovens are particularly beneficial as they do not change current catering process or equipment, leading to their ease of acceptability and use in the airline galley design and development industry. The ovens may be used with two standard 32-meal carriers, such that the carriers are positioned front to back in the oven. Alternatively, 64-meal carriers may be developed that fit into the double deep oven as well.

16 Claims, 9 Drawing Sheets

(56) References Cited

U.S. PATENT DOCUMENTS

2010/0140398 A1* 6/2010 Cunningham et al. .... 244/118.5

OTHER PUBLICATIONS

International Patent Application No. PCT/IB2013/056647, International Preliminary Report on Patentability dated Feb. 26, 2015.
PCT/IB2013/056647, Search Report and Written Opinion dated Jun. 24, 2014, 9 pages.

* cited by examiner ately sized and designed ovens and other
DOUBLE DEEP, SINGLE WIDTH OVENS FOR USE IN AIRCRAFT GALLEYS

CROSS REFERENCE TO RELATED APPLICATIONS

This application claims the benefit of U.S. Provisional Application Ser. No. 61/682,936, filed Aug. 14, 2012, titled "Aircraft Equipment Concepts," the entire contents of which are hereby incorporated by reference.

FIELD OF THE INVENTION

Embodiments of the present invention relate generally to double deep, single width ovens for use in aircraft galleys. The ovens are particularly beneficial as they do not change current catering processes or equipment, leading to their ease of acceptability and use in the airline galley design and development industry. The ovens may be used with two standard 32-meal carriers, such that the carriers are positioned front to back into the oven. Alternatively, 64-meal carriers may be developed that fit into the double deep oven as well.

BACKGROUND

In today's aircraft, meals are typically reheated from already partially cooked meals prepared in ground-based catering units. Once transported to the aircraft, these meals are typically carried into the galley, positioned in the ovens, and reheated in standard meal carriers that have a number of shelves holding approximately thirty-two individual meals. An example of such a meal carrier 60 is shown in FIG. 3. As shown in that figure, each of these standard 32-meal carriers is installed in a single deep oven compartment and reheated within about 20-30 minutes prior to serving to the passengers. An airline will normally install enough ovens on the aircraft to heat up all the meals required to serve all passengers on an aircraft at the same time, so that the airline attendants only need to make one pass through the cabin.

However, these ovens often occupy substantial space in the aircraft galley, they are costly to purchase and operate, and they each require individual electronic control systems, which also take up space. Specifically, the ovens occupy space that could be used to store other items and provide greater levels of service to passengers. It has also been determined that saving galley space can free up space for additional passenger seats, increasing airline revenue.

Although some airlines have sought to custom build galleys with specifically-sized and designed ovens and other items, it is more often than not the case that industry standard sizes prevail. This is particularly true with aircraft galley ovens, due to the related catering processes that are all well-established to use traditionally sized carriers. For example, the meals to be served are generally prepared in casseroles at an off-site catering location, which uses ovens the 32-meal carriers as a key part of the logistics operations in the preparation of airline meals. The meal carriers are then transported to and from the aircraft via meal carts, which are also designed to receive and transport the standard 32-meal carriers. Finally, the 32-meal carriers are then loaded onto the aircraft and positioned in the ovens until the catering process is set to begin. Because all of these systems have been developed (and institutionalized) over the years, redesigning a completely new aircraft galley oven without consideration for current catering standards is not economically feasible, as adoption of such an oven would be unviable.

The present inventor has thus sought to improve aircraft galley ovens without requiring new meal-carrier sizes or revising current catering logistics. The improved ovens have also been designed to take advantage of certain unused space areas identified on-board aircraft in order to provide deeper ovens that can accommodate more meals.

BRIEF SUMMARY

Embodiments of the invention described herein thus provide a double deep, but single wide oven that allows two standard aircraft meal carriers (typically an Atlas 32-meal carrier) to be heated in one deeper oven. Embodiments also relate to positioning the ovens in uniquely designed deeper galley configurations. In a specific embodiment, the double deep oven cavity allows for two standard 32-meal carrier racks to fit in the oven cavity in a front to back configuration. There is also provided a removal system to remove the back meal rack at the end of the cooking cycle without subjecting the flight attendant to being burned. Special heating methods and air circulation methods are also designed into the double deep oven in order to assure consistent meal temperatures across all 64 meals in the oven.

DETAILED DESCRIPTION

Figure 1:
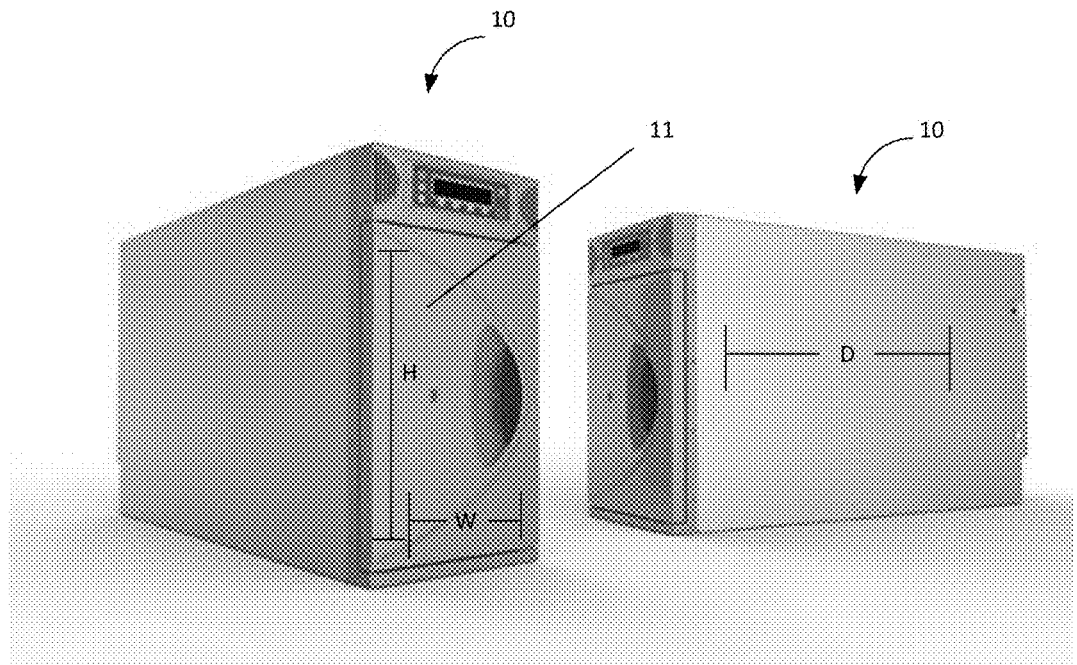
FIG. 1 shows side perspective views of one embodiment of a double deep oven.

Embodiments of the present invention provide a new double deep oven 10 that has been developed with a double deep length, without enlarging the face height and width of the oven. In other words, the oven is double deep, but still single wide. FIG. 1 shows one embodiment of a double deep oven 10. The depth D of the oven 10 is generally about twice as deep (or long) as that of a traditional aircraft galley oven. The current standards for aircraft galley ovens are 22.4 inches deep×22.086 inches high×11.22 inches wide. As discussed above, these standard ovens have an internal chamber that is specifically designed to contain and heat a single 32-meal carrier. The present inventor has sought to develop an oven with a deeper oven construction, such that it has sufficient room in the interior oven compartment to contain two separate 32-meal carriers to be inserted, one in front of the other. The oven face 11 has a height H and a width W that is similar to that of a conventional standard aircraft galley oven.

Figure 2:
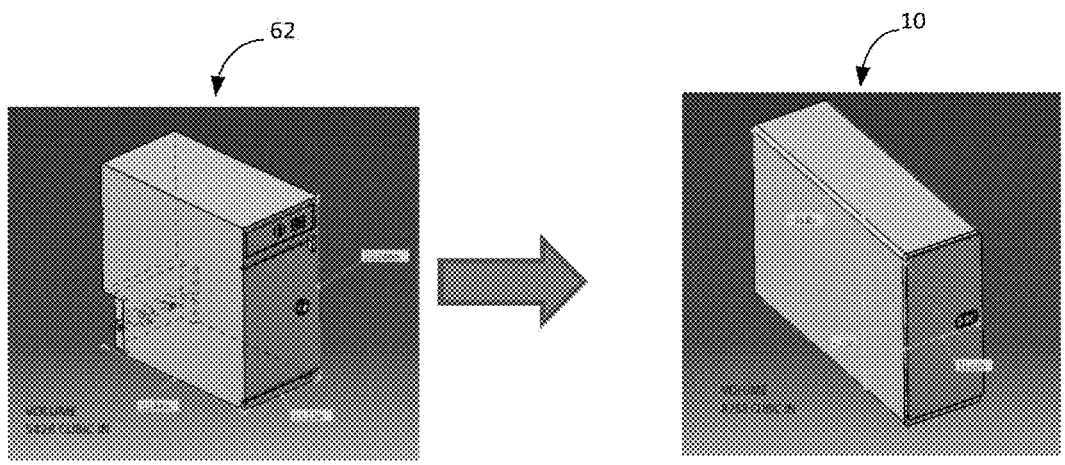
FIG. 2 shows a size comparison between a standard oven and a double deep oven.
Figure 3:
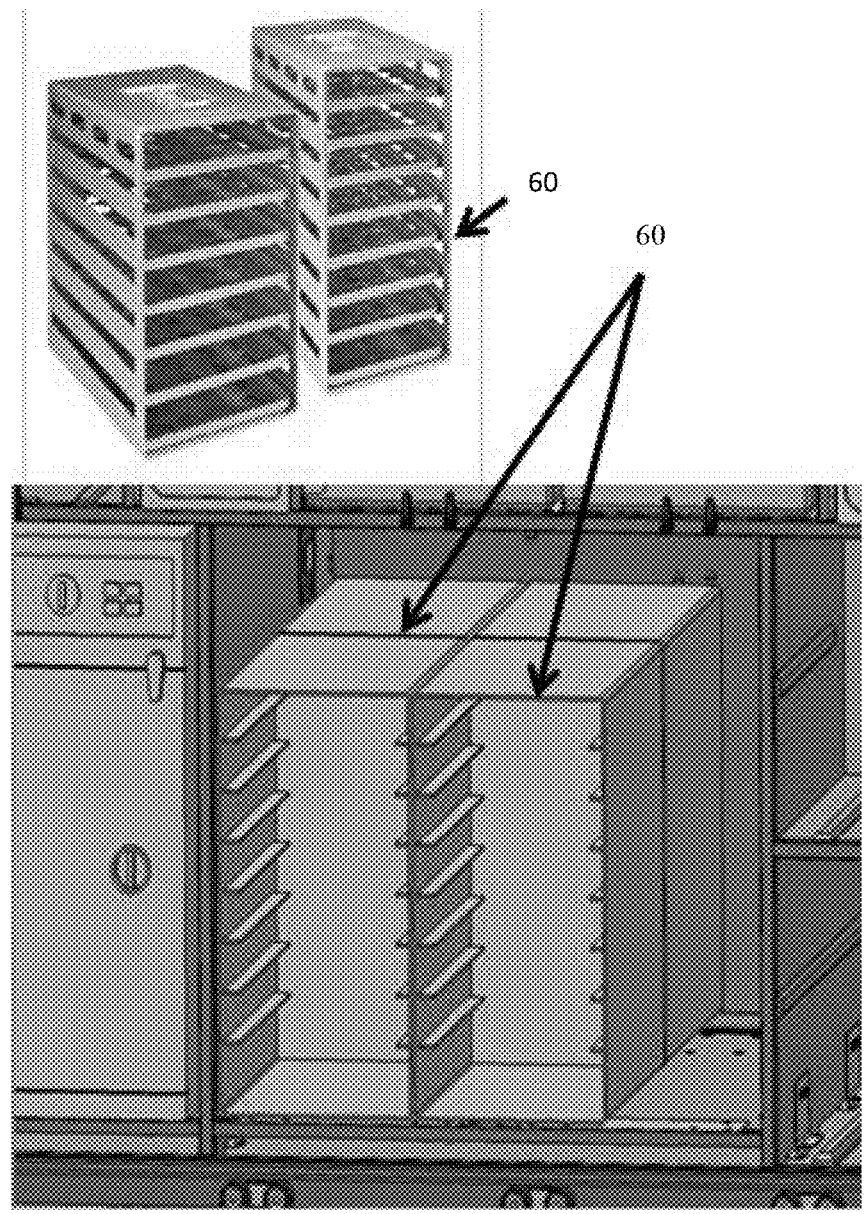
FIG. 3 shows a perspective of meal carriers being positioned in an oven.

FIG. 2 illustrates the dimensional differences between a current standard aircraft galley oven 62 and the new double deep oven 10. Generally speaking, standard ovens have a volume of about 5428 cubic inches, with a height of about 22 inches, a width of about 11.2 inches, and a depth of about 22.4 inches. By contrast, one embodiment of the double deep oven 10 has a volume of about 8258 cubic inches, with a height of about 20 inches, a width of about 11.2 inches, and a depth of about 36.8 inches. Although the depth of the double deep oven 10 is not exactly twice that of the standard oven, it provides a cooking chamber that can hold two 32-meal carriers. Although others may have sought to develop ovens that could hold more meals and/or more meal carriers, one common challenge is finding the space for the extra oven dimensions. Aircraft galleys are very tight spaces and space is money, so airlines do not want to expand galleys to the detriment of losing paying passenger seats. Accordingly, one important feature of the oven embodiments is the additional aircraft space identified for housing the extra oven size. FIG. 3 illustrates two standard 32-meal Atlas meal carriers 60, and how they look with one in front and one in back, as well as how four meal carriers can fit into a galley compartment that used to hold two single deep ovens.

Figure 4:
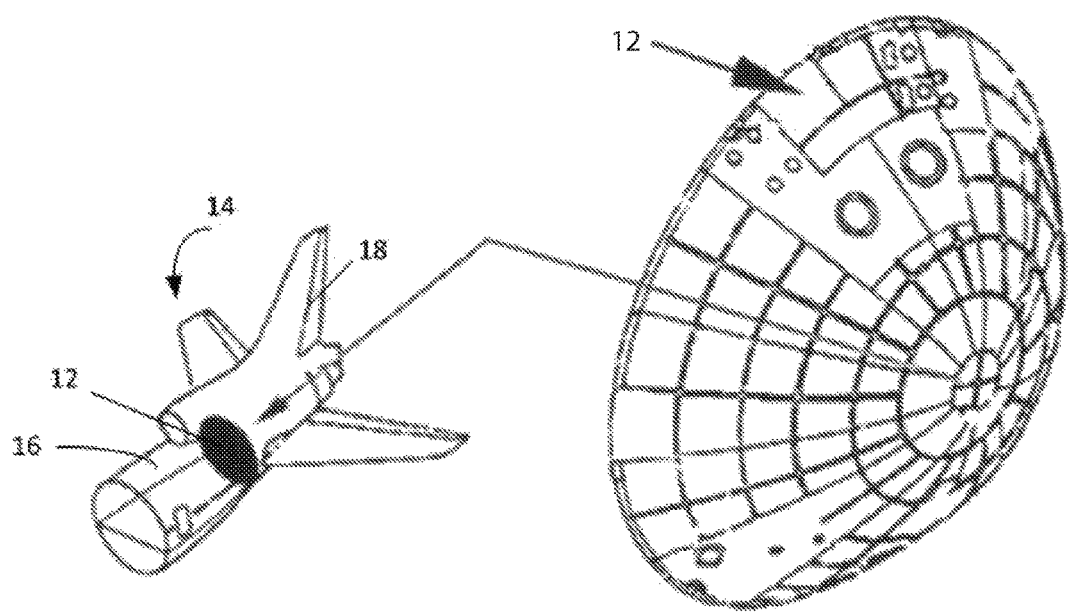
FIG. 4 shows a schematic view of the location of a pressure bulkhead on an aircraft.
Figure 5:
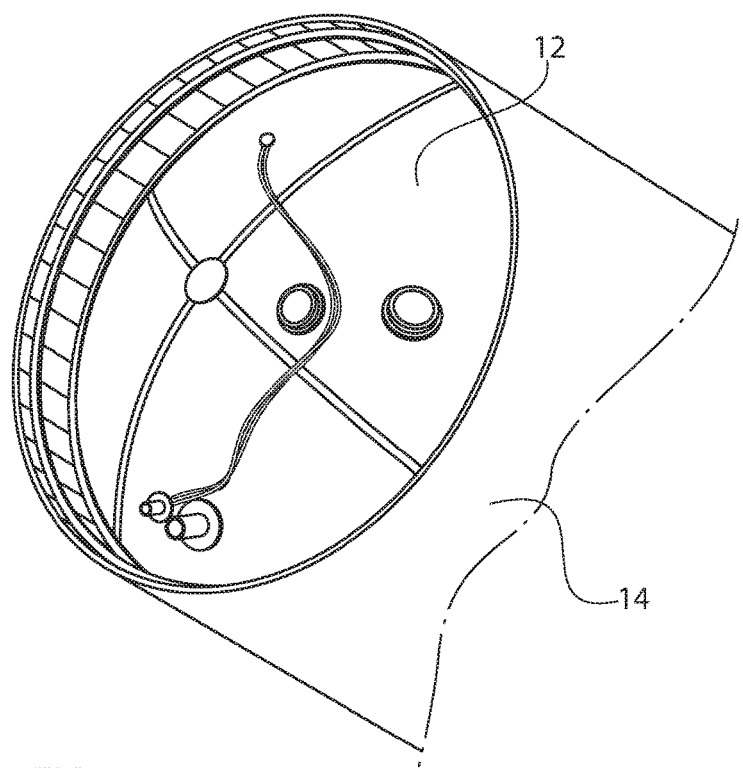
FIG. 5 shows a rear perspective of the location of a pressure bulkhead on an aircraft.
Figures 6, 7:
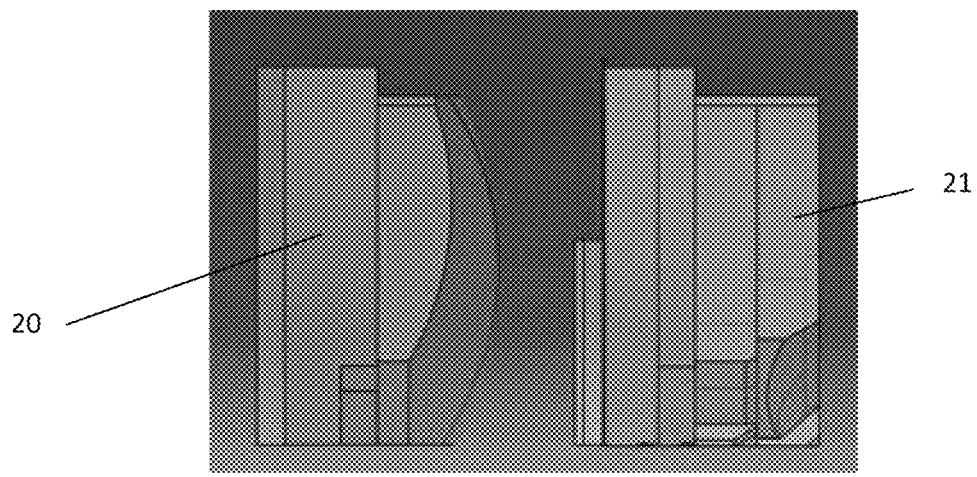
FIG. 6 shows a domed bulkhead.
FIG. 7 shows a flat bulkhead.

In one embodiment, the added oven depth is accommodated by the pressure bulkhead at the aft of the aircraft. For example, as shown in FIGS. 4 and 5, the aft pressure bulkhead 12 (also referred to as the rear pressure bulkhead) is a component of all large commercial aircraft 14. It is an airtight bulkhead located between the cabin 16 and the tail 18 of the aircraft. Its purpose is to seal the rear of the aircraft and thus maintain cabin pressure via a pressure dome 20, as shown in FIG. 5. The aft pressure bulkhead 12 is a vital part of the aircraft 14, and is generally present on all aircraft. Some pressure bulkheads have a concave pressure bulkhead, or a pressure dome 20, as shown in FIG. 6. Other pressure bulkheads may have a flat pressure bulkhead 21, as shown in FIG. 7.

Figure 8:
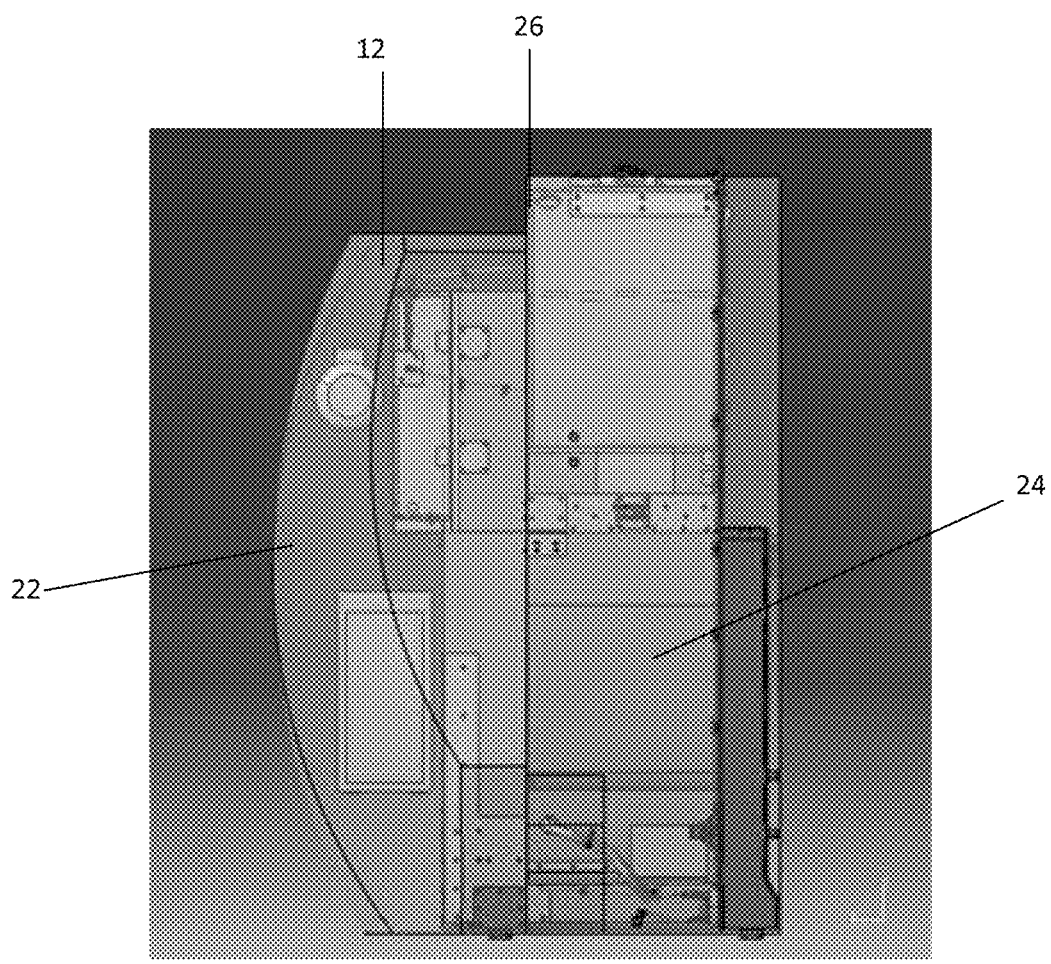
FIG. 8 shows a side cross sectional view of an aft galley taking advantage of unused space in the pressure bulkhead.
Figure 9:
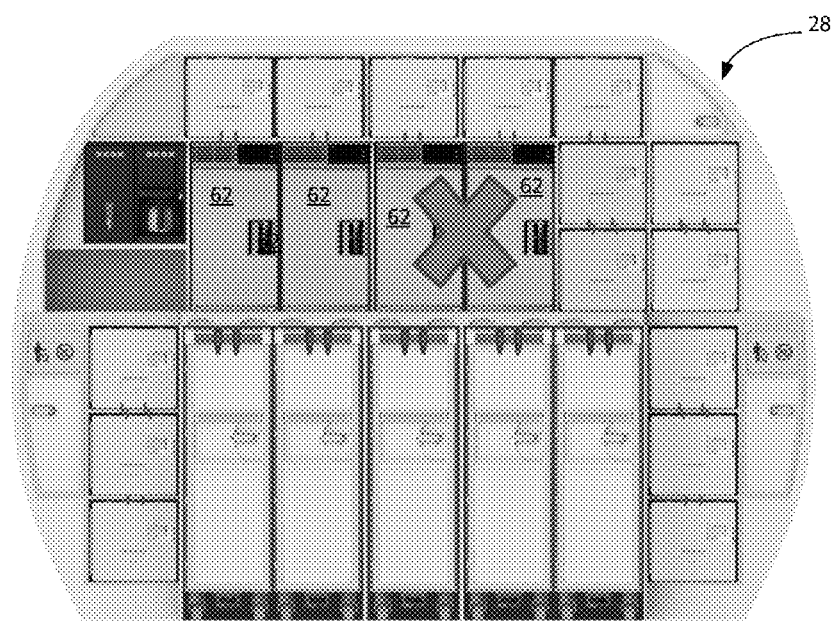
FIG. 9. Shows a schematic of how two oven compartments may be unnecessary by using embodiments of the present invention.

However, although the pressure bulkhead 12 is necessary on the aircraft 14 for safety and technical reasons in order to manage pressure and load, there is also unused space 22 in the pressure bulkhead 12, as shown in FIG. 8. Aircraft design has been such that a forward-facing galley 24 is traditionally positioned at the aft of aircraft, directly in front of the pressure bulkhead 12. This is, in part, in order to cover the pressure bulkhead 12. However, the back walls of these galleys have not monopolized on this unused space 22 until now.

Figure 10:
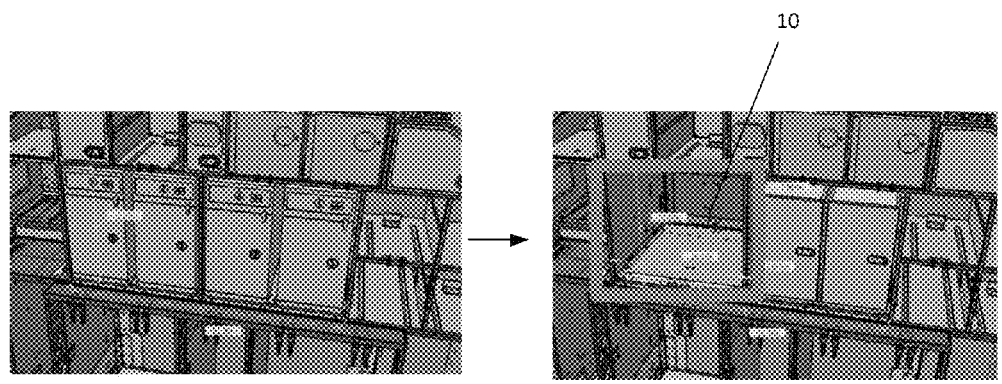
FIG. 10 shows the extra compartment space that may be created.

As shown in FIG. 8, the back wall 26 of the aft galley 24 may be extended back into space 22, in order to allow various components such as ovens to be lengthened and/or enlarged in order to take advantage of this unused space. This galley configuration shows four standard ovens 62, with an "X" across two of the ovens, representing that two of the ovens may be replaced with double deep ovens 10, without losing any number of meals that can be heated, but garnering two extra compartment spaces 64, as shown in FIG. 10. By optimizing the galley position of the double deep oven and allowing it to extend into the deepest curvature area of the pressure dome 20, there is sufficient space behind the galley 24 for double deep ovens 10 to be installed.

Figure 11:
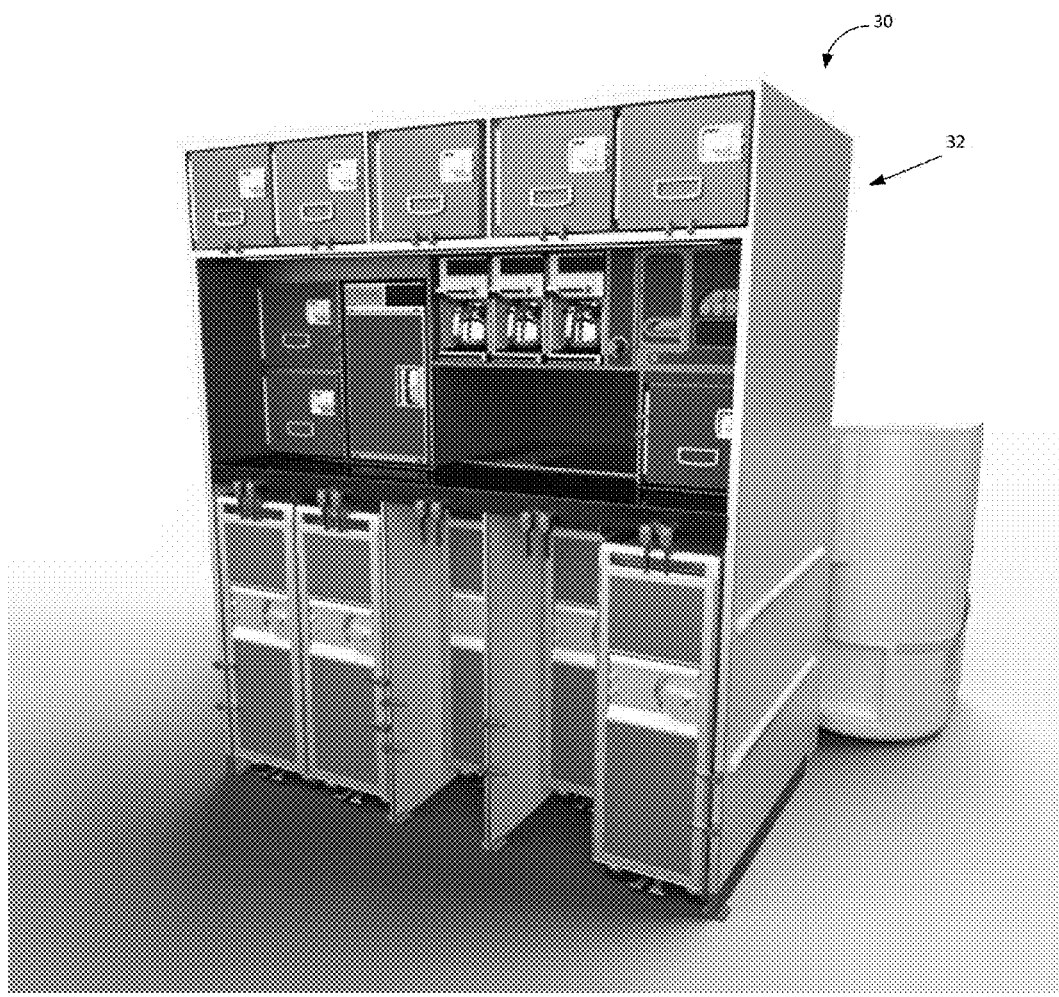
FIG. 11 shows one embodiment of a T-shaped galley.

In another embodiment, cabin optimization for overseas flights has also taken advantage of new seat configurations, such as herringbone configurations that have angled seats, with some forward and some aft facing, and other configurations. These new seat configurations have been found to increase the number of passenger seats that can be installed on an aircraft, leading to improved revenues. Such seat configurations have also led to improved galley spaces and designs. One example of an improved galley shape 30 is a new deeper, center-line galley designed for wide-body aircraft shown in FIG. 11. This galley 30 may have an extended area 32 that provides additional space in order to house and contain added depth for the double deep ovens 10 described herein. This is an important improvement because added seats mean that additional meals will need to be served in-flight.

The double deep ovens 10 described herein may be traditional resistive heating coil ovens, steam ovens, convection ovens, or any combination thereof. An example of potential oven components is provided in FIGS. 13 and 14. One issue that has been experienced even with standard ovens is a large ΔT (change in temperature) between meals that have been heated in the oven. For example, for some ovens, the ΔT between meals in the same 32-meal carrier can vary as much as 30° F. This renders some meals being cold to the touch while other meals may be burned. Accordingly, these challenges are even greater with a double deep oven, which provides a deeper depth and heats twice as many meals as a standard oven.

Figure 13:
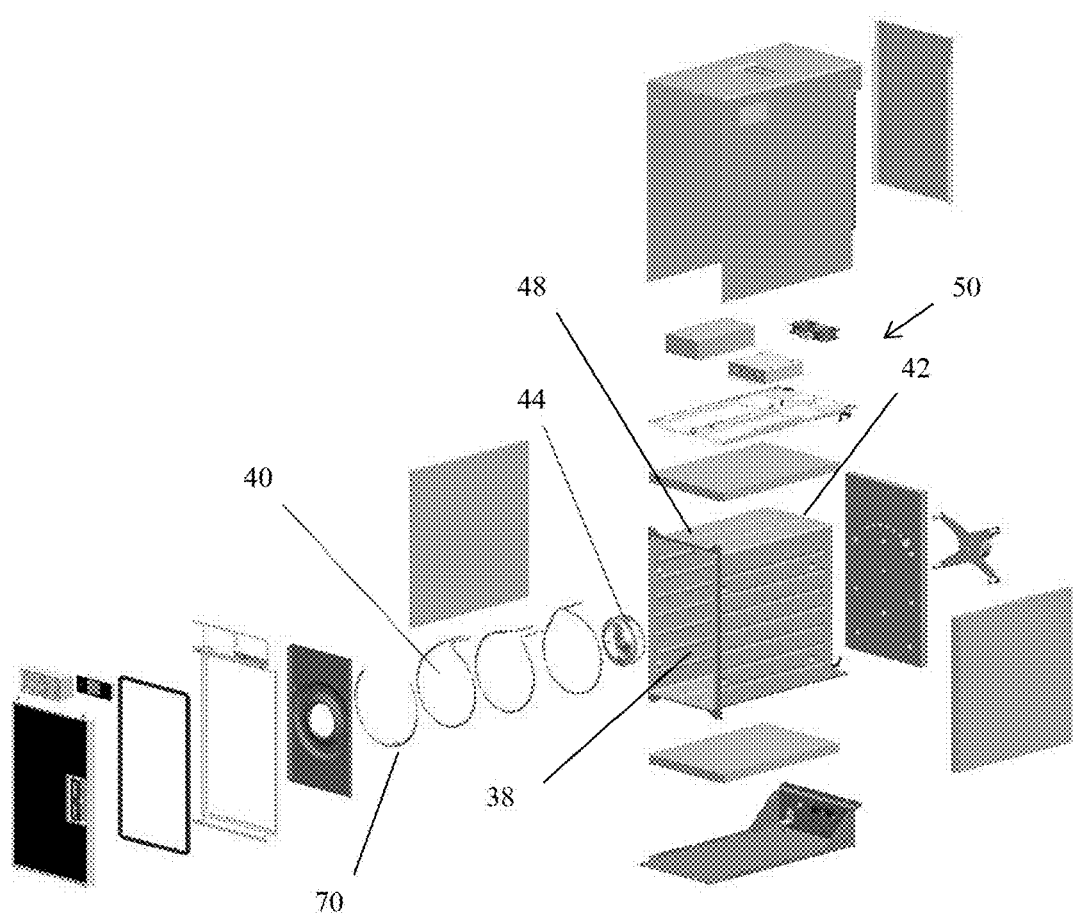
FIG. 13 shows an exploded view of potential oven components.
Figure 14:
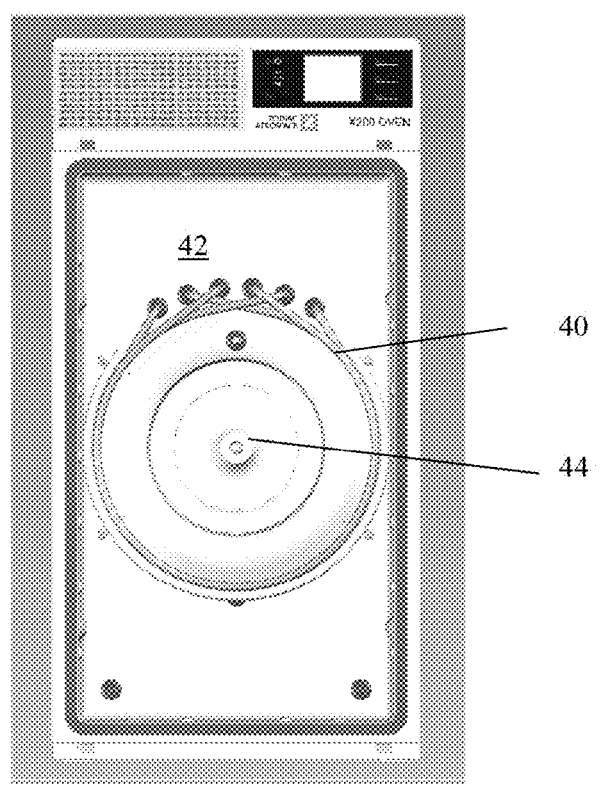
FIG. 14 shows a rear view of an assembled oven.

In one embodiment, the double deep oven 10 is provided with a first wire/coil heater or other heating element 40 at the back wall 42 of the oven, as well as a first blower fan 44 to circulate the heat throughout and back into the cooking cavity 38. This is illustrated by FIGS. 13 and 14. The oven may also have a second wire/coil heater or other heating element at the upper wall 48 of the oven, as well as a second blower fan to circulate the heat throughout and down into the cooking cavity 38. Because the oven 10 has the same height as the standard ovens, one way that space is accommodated for the upper wall heating element and upper blower fan is by moving the oven control electronics 50 away from the upper part of the oven (the position at which control electronics are located on a standard oven) and moving them to an alternate location. In one embodiment, the control electronics 50 are positioned at the back of the oven, buffered from the back heating element 40 by blower fan 44. In another embodiment, the control electronics 50 are positioned at a remote location from the oven and controlled remotely.

In one embodiment, the ovens may be operated in steam mode (via use of a steam generator 70) but be provided with an automatic switch built-in to convert to convection mode should there be a water supply failure. Other traditional oven features may be provided on the double deep oven.

In use, the aircraft caterer loads two 32-meal carriers into the cooking cavity 38, without any need to change the process, other than having more meals if more ovens are to be filled and loading two carriers into each oven, front to back. It is envisioned that 64-meal carriers may be developed which may ease the loading and heating process, but they are not required.

Figure 12:
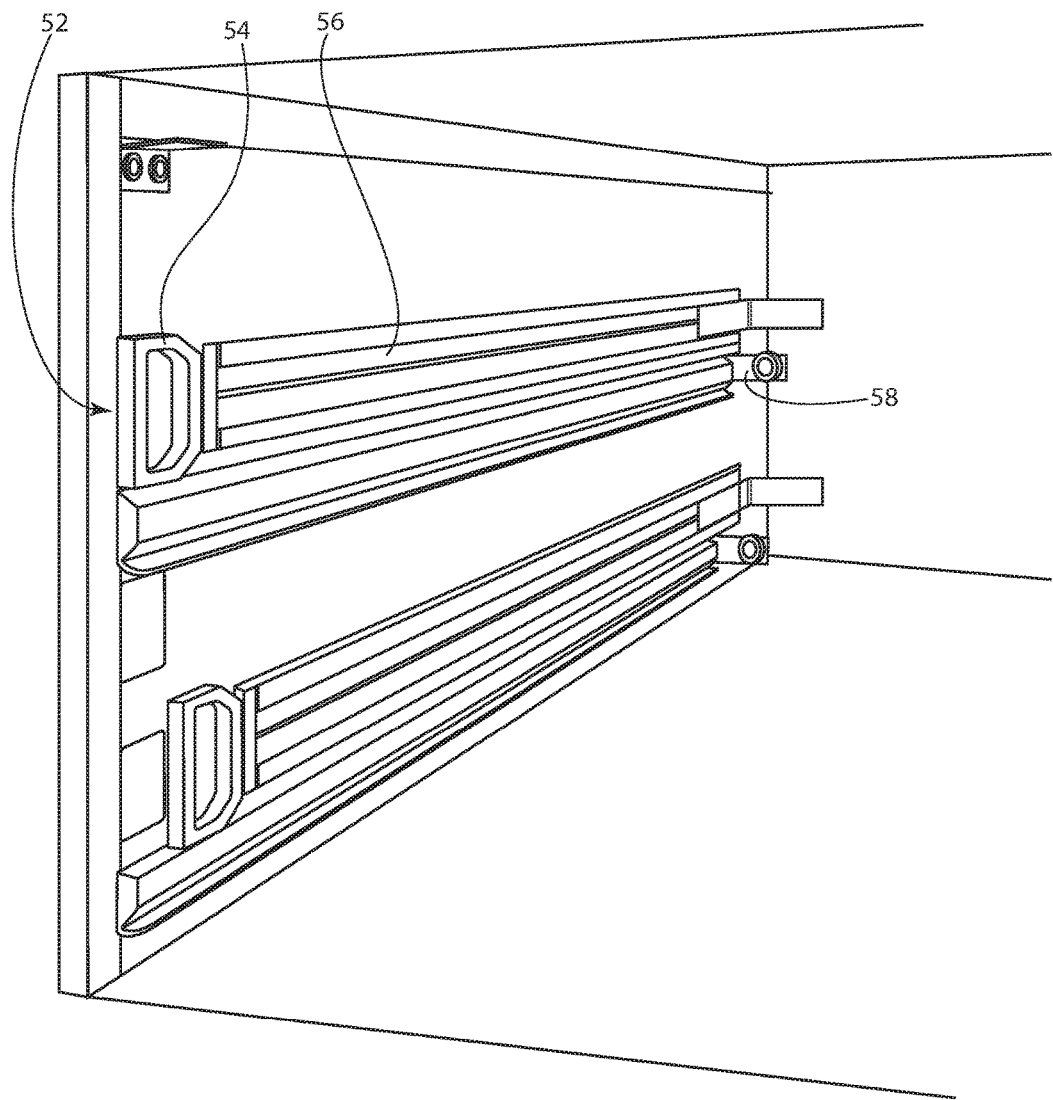
FIG. 12 shows one embodiment for a removal system for removing the back meal carrier from a double deep oven.

In order to remove the meal carrier that is positioned the deepest in the oven 10, there may be a removal system 52, designed to prevent the user from getting burned. One embodiment of a removal system 52 is shown in FIG. 12. This figure shows a handle 54 with an elongated arm 56 attached to a protruding tab 58. The handle may be pulled forward to cause movement of elongated arm 56 and tab 58 in order to push the bask-most meal carrier forward. It should be understood that this is just one example of a potential removal system and other solutions are possible and within the scope of this invention. For example, the removal system may be electronic, such that the user only need press a button and the back meal carrier is caused to slide forward. Additionally or alternatively, the meal carriers may be on slidable racks that can be moved forward, much like a sliding cabinet drawer. Other options are also possible.

Changes and modifications, additions and deletions may be made to the structures and methods recited above and shown in the drawings without departing from the scope or spirit of the invention and the following claims.

What is claimed is:

1. A double deep oven designed for use on-board an aircraft that has a pressure bulkhead, the oven used for heating passenger meals and comprising:
   a. an interior cooking chamber having a depth dimensioned to receive two standard 32-meal carriers in a front to back configuration within the double deep oven, the depth being greater than about 22.4 inches;
   b. an oven face that complies with industry standards for aircraft galley oven face height and width;
   wherein the double deep oven is positioned in an aft galley and mounted directly in front of the pressure bulkhead such that the depth of the oven uses empty space created by the pressure bulkhead.

2. A double deep oven designed for use on-board an aircraft deeper galleys, the oven used for heating passenger meals and comprising:
   a. an interior cooking chamber having a depth dimensioned to receive two standard 32-meal carriers in a front to back configuration within the double deep oven, the depth being greater than about 22.4 inches;
   b. an oven face that complies with industry standards for aircraft galley oven face height and width;
   wherein the double deep oven is positioned in the deeper galley such that the depth of the oven uses empty space created by an extended section of the galley.

3. A double deep oven designed for use on-board an aircraft, the oven used for heating passenger meals and comprising:
   a. an interior cooking chamber having a depth dimensioned to receive two standard 32-meal carriers in a front to back configuration within the double deep oven, the depth being greater than about 22.4 inches;
   b. an oven face that complies with industry standards for aircraft galley oven face height and width;
   c. a back wall having a first heating element and a first blower; and
   d. an upper wall having a second heating element and a second blower.

4. A double deep oven designed for use on-board an aircraft, the oven used for heating passenger meals and comprising:
   a. an interior cooking chamber having a depth dimensioned to receive two standard 32-meal carriers in a front to back configuration within the double deep oven;
   b. an oven face that complies with industry standards for aircraft galley oven face height and width;
   c. a back wall having a first heating element and a first blower;
   d. an upper wall having a second heating element and a second blower; and
   e. control electronics positioned at the back wall of the oven, buffered from the first heating element by the first blower.

5. The double deep oven of claim 1, further comprising control electronics positioned at a remote location from the oven.

6. A double deep oven designed for use on-board an aircraft that has a pressure bulkhead, the oven used for heating passenger meals and comprising:
   (a) an interior cooking chamber having a depth dimensioned to receive two standard 32-meal carriers in a front to back configuration within the double deep oven;
   (b) an oven face that complies with industry standards for aircraft galley oven face height and width;
   wherein the double deep oven is positioned in an aft galley and mounted directly in front of the pressure bulkhead such that the depth of the oven uses empty space created by the pressure bulkhead, wherein the oven may be operated in steam mode, convection mode, or a combination thereof.

7. A double deep oven designed for use on-board an aircraft that has a pressure bulkhead, the oven used for heating passenger meals and comprising:
   (a) an interior cooking chamber having a depth dimensioned to receive two standard 32-meal carriers in a front to back configuration within the double deep oven;
   (b) an oven face that complies with industry standards for aircraft galley oven face height and width; and
   (c) a removal system for moving rear-most meal carriers positioned at a rear of the oven forward;
   wherein the double deep oven is positioned in an aft galley and mounted directly in front of the pressure bulkhead such that the depth of the oven uses empty space created by the pressure bulkhead.

8. The double deep oven of claim 7, wherein the removal system comprises a handle with an elongated arm, slidable racks that can be moved forward, or electronically causes back meal carriers to slide forward.

9. The double deep oven of claim 2, further comprising control electronics positioned at a remote location from the oven.

10. A double deep oven designed for use on-board an aircraft deeper galleys, the oven used for heating passenger meals and comprising:
   a. an interior cooking chamber having a depth dimensioned to receive two standard 32-meal carriers in a front to back configuration within the double deep oven;
   b. an oven face that complies with industry standards for aircraft galley oven face height and width;
   wherein the double deep oven is positioned in the deeper galley such that the depth of the oven uses empty space created by an extended section of the galley,
   wherein the oven may be operated in steam mode, convection mode, or a combination thereof.

11. A double deep oven designed for use on-board an aircraft deeper galleys, the oven used for heating passenger meals and comprising:
   a. an interior cooking chamber having a depth dimensioned to receive two standard 32-meal carriers in a front to back configuration within the double deep oven;

b. an oven face that complies with industry standards for aircraft galley oven face height and width; and c. further comprising a removal system for moving rear-most meal carriers positioned at a rear of the oven forward;

wherein the double deep oven is positioned in the deeper galley such that the depth of the oven uses empty space created by an extended section of the galley.

12. The double deep oven of claim 11, wherein the removal system comprises a handle with an elongated arm, slidable racks that can be moved forward, or electronically causes back meal carriers to slide forward.

13. The double deep oven of claim 3, further comprising control electronics positioned at a remote location from the oven.

14. A double deep oven designed for use on-board an aircraft, the oven used for heating passenger meals and comprising:

a. an interior cooking chamber having a depth dimensioned to receive two standard 32-meal carriers in a front to back configuration within the double deep oven;

b. an oven face that complies with industry standards for aircraft galley oven face height and width;

c. a back wall having a first heating element and a first blower; and d. an upper wall having a second heating element and a second blower, wherein the oven may be operated in steam mode, convection mode, or a combination thereof.

15. A double deep oven designed for use on-board an aircraft, the oven used for heating passenger meals and comprising:

a. an interior cooking chamber having a depth dimensioned to receive two standard 32-meal carriers in a front to back configuration within the double deep oven;

b. an oven face that complies with industry standards for aircraft galley oven face height and width;

c. a back wall having a first heating element and a first blower; and d. an upper wall having a second heating element and a second blower; and e. a removal system for moving rear-most meal carriers positioned at a rear of the oven forward.

16. The double deep oven of claim 15, wherein the removal system comprises a handle with an elongated arm, slidable racks that can be moved forward, or electronically causes back meal carriers to slide forward.

* * * * *